(12) United States Patent
Wawrla et al.

(10) Patent No.: US 8,524,078 B2
(45) Date of Patent: Sep. 3, 2013

(54) WATER TANK AND SEPARATELY FORMED FILTER CARTRIDGE CONNECTION ELEMENT WHICH CAN BE CONNECTED TO SAID WATER TANK

(75) Inventors: Andreas Wawrla, Widnau (CH); Roland Scholz, Balgach (CH)

(73) Assignee: AQUIS Wasser-Luft-Systeme GmbH, Lindau Zweigniederlassung Rebstein, Rebstein (CH)

(*) Notice: Subject to any disclaimer, the term of this patent is extended or adjusted under 35 U.S.C. 154(b) by 847 days.

(21) Appl. No.: 12/457,899

(22) Filed: Jun. 24, 2009

(65) Prior Publication Data
US 2009/0321342 A1    Dec. 31, 2009

(30) Foreign Application Priority Data
Jun. 27, 2008 (DE) .......................... 10 2008 030 166

(51) Int. Cl.
  *B01D 35/027* (2006.01)
  *B01D 27/08* (2006.01)
  *B01D 35/30* (2006.01)

(52) U.S. Cl.
  USPC ........................................ 210/232; 210/172.1

(58) Field of Classification Search
  USPC ................................................ 210/232, 172.1
  See application file for complete search history.

(56) References Cited

U.S. PATENT DOCUMENTS 5,254,242 A * 10/1993 van der Meer et al. ......... 210/91
8,202,419 B2 * 6/2012 Wallerstorfer et al. ....... 210/232

FOREIGN PATENT DOCUMENTS

| DE | 10 2004 049 877 A1 | 4/2006 |
| DE | 102006027267 A1 * | 1/2007 |
| DE | 10 2007 038 027 A1 | 2/2008 |
| DE | 10 2007 038 019 A1 | 4/2008 |
| DE | 10 2007 038 025 A1 | 4/2008 |
| EP | 1 340 442 A | 2/2008 |
| WO | WO2008/017492 A2 * | 2/2008 |

* cited by examiner

*Primary Examiner* — Thomas M Lithgow
(74) *Attorney, Agent, or Firm* — Breneman & Georges

(57) ABSTRACT

The present invention relates to a water tank and to a filter cartridge connection element which can be connected to said water tank, and also to fixing means for fixing said filter cartridge connection element to the tank. In this case, the fixing means are distinguished in that they are formed such that the filter cartridge connection element can no longer be detached from the tank without being destroyed.

17 Claims, 3 Drawing Sheets

Figure 1:
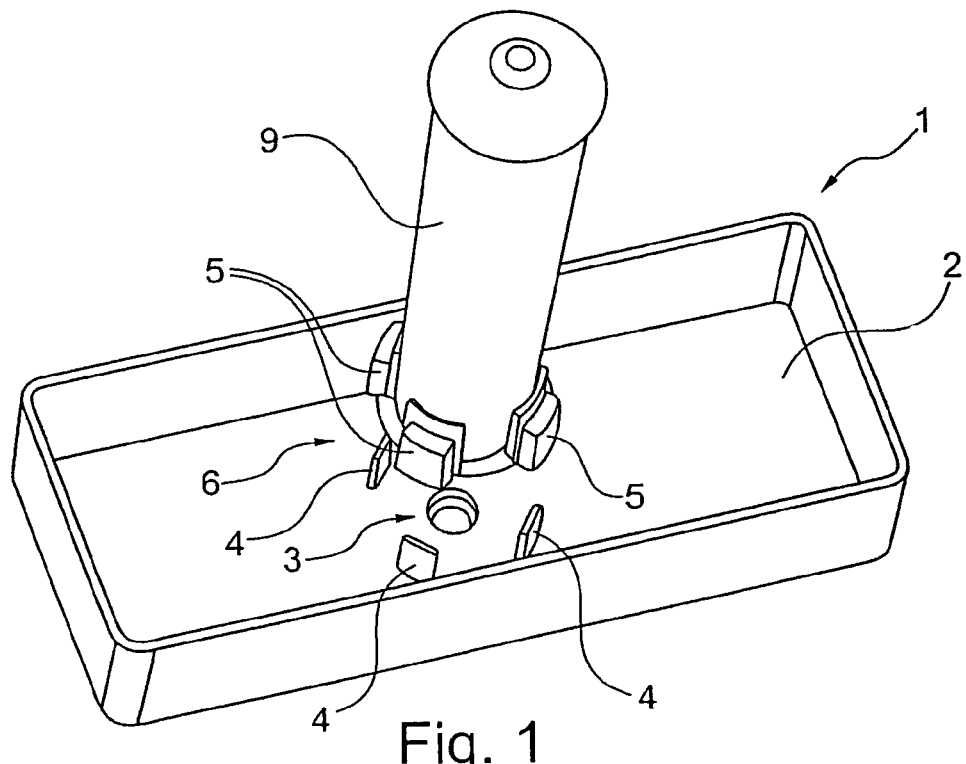

WATER TANK AND SEPARATELY FORMED FILTER CARTRIDGE CONNECTION ELEMENT WHICH CAN BE CONNECTED TO SAID WATER TANK

BACKGROUND OF THE INVENTION (1) Field of the Invention

The present invention relates to a water tank and to a filter cartridge connection element which can be connected to the water tank and more particularly for tanks such as coffee machines, water preparation appliances and devices which generally have a filter cartridge connection in the interior of the water tank.

(2) Description of Related Art Including Information Disclosed Under 37 CFR 1.97 and 1.98

The use of filter systems is known to treat untreated water which preferably originates from water channeling supply systems. The use of a water tank for storing the untreated water to be treated is known for appliances or filter apparatuses which are not connected to a water channeling system.

Appliances may include, for example, any beverage preparation machines, such as coffee, tea or drinking water preparation machines. Filter apparatuses may include, for example, table filter jugs or the like. Both suction operation and gravimetric operation are possible in principle in both cases. In the case of suction operation, a suction apparatus, for example a pump, is preferably provided. In the case of gravimetric operation, the untreated water to be filtered is conducted by the force of gravity, preferably from a first vessel into a second vessel which is arranged beneath said first vessel, it being possible for each vessel to be a tank, for example.

However, in addition to the manner of operation of the means treating the untreated water, the quality of the untreated water itself is also essential to the quality of the treated water. The means treating the untreated water can in part vary massively in terms of its composition, concentration and/or manner of operation, depending on the said quality of the untreated water and on the respective intended use. In order to ensure that only the operationally determined water treatment means can be used for the respective intended use, a filter cartridge connection apparatus can be provided on the tank, this filter cartridge connection apparatus exactly matching a specific, complementary connection structure of a filter cartridge-side tank connection element.

BRIEF SUMMARY OF THE INVENTION

The present invention is based on the object of improving a water tank and a filter cartridge connection apparatus which is provided for the water tank compared to the prior art described in the introductory part.

Starting with water tanks which have a filter cartridge disposed inside the tank this object is achieved by having a filter cartridge connection apparatus or component that is formed separately from the water tank which also has a fixing means for fixing the filter cartridge connection apparatus in the water tank such that once fixed it can no longer be detached without being destroyed.

Advantageous embodiments and developments of the invention are achieved by having a fixing means on the filter cartridge connection apparatus or component in the form of an adhesive connection on the surface of the tank and/or the connection element, by having a fixing means with structures that structurally damage the surface of the tank and/or connection element, by having the fixing means in the form of a press-fit connection between the surface of the tank and/or the connection element, by having the fixing means comprise a barb like structure, by having the fixing means comprise a cutting ring, by having the fixing means comprise a glued connection between the surface of the tank and/or the connection element, by having the fixing means comprise a fused connection with the surface of the tank and/or the connection element by having the fixing means comprise a leaf-like insert and/or inlay element, by having a tank-side connecting element for interacting with the fixing means, by having the connecting element for interacting with the fixing means disposed on the filter cartridge connection element, by having the filter cartridge connection element connected to the tank in the region of the water outlet, by providing a sealing structure and by providing a coding structure.

Accordingly, the present invention relates in a first aspect to a water tank for use in automatic beverage machines such as coffee machines, water preparation appliances or the like. This water tank is distinguished in that a filter cartridge connection apparatus which is formed separately from the water tank is provided, said filter cartridge connection apparatus having fixing means for fixing the connection apparatus in the water tank such that it is fixed once and then can no longer be detached without being destroyed.

Fixing which can no longer be detached without being destroyed refers in this case to connection loads which are customary during operation, as occur when inserting and replacing filter cartridges. Repeated disconnection of the combination comprising filter cartridge connection apparatus and water tank which is joined once in this way should hereby be reliably prevented under such customary operating stresses. However, this single-use fixing means should withstand dismantling using a tool, for example a screwdriver or pliers, at least within the scope of a replacement attempt which is not designed to destroy the connection.

The use of such fixing means, which are also called single-use fixing means in the text which follows, has the advantage that, as a result, manipulation protection can be provided for a precisely defined interface between the water tank and the water treatment means which are provided for treating the untreated water, it being possible for the interface to be formed, for example, by the two complementary structures of the tank-side filter cartridge connection apparatus and a filter cartridge-side tank connection element which is associated with said filter cartridge connection apparatus.

The single-use fixing means therefore reliably prevent unintentional removal of the filter cartridge tank connection element when replacing a filter cartridge. However, it also prevents both unintentional and intentional manipulation at the interface between the water tank and filter cartridge, and so only those filter cartridges which are also provided by the tank manufacturer can be used as a result.

According to the invention, filter means are understood to be any means for treating the water which comes into contact with said means. In addition to means for extracting possibly undesired substances contained in the water to be treated, said filter means should also include, in particular, means for enriching said water to be treated.

According to the invention, a filter cartridge is understood to be a housing containing a filter means, which housing has a mechanical connection structure for connection to a filter cartridge connection apparatus.

According to the invention, a filter cartridge connection apparatus is understood to be a body which is produced separately from the water tanks and can be connected to said water tank, preferably in a sealed manner, and which has a connection structure which complements a connection structure of a filter cartridge.

In one possible embodiment, the fixing means can form an adhesive connection with the surface of the tank and/or of the connection element.

According to the invention, an adhesive connection is understood to be, within the meaning of the definition according to Duden (adhere equals stick), a connection which firmly connects two separate parts to one another and which is stable under customary operating conditions (regularly insert and remove filter cartridges again) over the long-term. An adhesive connection of this type differs both from a screw connection and from a clamping connection, which acquire their fixing action from the effects "screw-connecting", such as bolt-connecting or the like, or "clamping" in the sense of compression.

In one preferred embodiment, the fixing means can be formed such that they have means, in particular structures, which structurally change and/or damage the surface of the tank and/or of the connection element. As a result, these single-use fixing means can, as it were, be fastened, in particular can cling, to the surface of the tank and/or to a receptacle element which is formed on said tank, for example in the manner of a barb. The same analogously applies to a connection to the filter cartridge connection element or a receptacle element which is formed on said filter cartridge connection element.

In a further preferred embodiment, the fixing means can also form a press-fit connection between the surface of the tank and/or of the connection apparatus, possibly also in combination with the above-described embodiment which has structures which damage the surface of one or both of the elements to be connected. By way of example, a multilayer structure can be provided for this purpose, one layer of this multilayer structure forming part of the surface of the filter cartridge connection apparatus, a further part forming a single-use fixing means, and a third layer being a surface region which is associated with the tank or a corresponding receptacle element. If the distance between the surface of the filter cartridge connection apparatus and the surface of the water tank is smaller than a single-use fixing means which is arranged between these two surfaces, all three are pressed against one another at the respective contact points and can therefore form a corresponding press-fit connection, in particular preferably with the above-described structural change in the relevant surface regions of the two parts which are to be connected to one another.

In a further preferred embodiment, the fixing means can comprise means which also form a glued connection with the surface of the tank and/or of the connection element. A connection between the tank and the filter cartridge connection apparatus which can no longer be detached under customary operating loads is also possible as a result. Depending on the adhesive used, said adhesive can for all intents and purposes attack the surface of one and/or other of the parts which are to be connected to one another and enter into a structural connection with said part or parts in order to fix the two parts to one another.

The same substantive matter is analogously produced for a further preferred embodiment in which the fixing means causes or enters into a fused connection with the surface of one and/or the other of the parts, tank and filter cartridge connection apparatus, which are to be connected to one another. A fused connection of this type can be produced, for example, by heating the surface region or surface regions in question. For example, it would be feasible to perform heating after the filter cartridge connection apparatus and the tank are joined, for example by ultrasound welding or the like. It would also be feasible to heat a means, for example a metal leaf, which is arranged between the tank and/or a tank-side connection apparatus and the filter cartridge connection element, said means being correspondingly heated before and/or after connection of the filter cartridge connection element to the tank and firmly adhering to the partly fused surface after cooling.

In one particularly preferred embodiment, the fixing means can comprise the leaf-like insert and/or inlay elements which can be fixed in and/or on a correspondingly formed receptacle in a preparatory manner, for example for preparing for connection of the filter cartridge connection apparatus to the tank, in order to firmly connect the filter cartridge connection apparatus and the tank to one another, preferably such that they can no longer be detached from one another again, after the filter cartridge connection apparatus and tank are joined.

In an embodiment which is modified relative to the above, the fixing means can also be designed, for example, in the form of a closed or else open cutting ring which allows insertion or pushing on in one direction, and, given a movement in the opposite direction, causes a cutting and/or clawing effect due to getting caught in the surface of the mating element in question. An element which causes this cutting effect can be formed such that it points radially inward and/or acts radially outward. In this respect, it is possible to form, for example, an individual element, which is possibly divided in the circumferential profile, with respectively different orientation. However, embodiments in which two or more, preferably separately formed, cutting elements are also provided are also feasible, said cutting elements being oriented in at least one of the two opposite directions, radially inward or radially outward. However, embodiments in which two or more cutting elements are formed in the same direction in a manner oriented radially inward and/or radially outward are also feasible. It may also be advantageous when a tank-side connecting element for interacting with the fixing means is provided. A connecting element of this type may be injection-molded onto the tank, for example, relatively simply during production of the tank, and represents a connection option which is easy to achieve. A further advantage of a tank-side connecting element of this type may be found in a deliberately prescribable mechanical stability which firstly ensures that the customary operating load created by insertion and removal of a filter cartridge when it is being replaced is withstood over the entire operating time of the tank, but secondly breaks off in the event of an impermissible manipulation attempt, in order to be able to ensure that the filter cartridge connection apparatus which was originally inserted into the water tank cannot be simply replaced by another one. Analogously, a corresponding connecting element which is further advantageously formed on the filter cartridge connection apparatus can have the same function and effect.

In a further preferred embodiment, the filter cartridge connection apparatus can be connected to the tank in the region of the water outlet of said tank. This has the advantage that the untreated water located in the tank can be conducted directly out of the tank after flowing through the filter section.

In this case, it is particularly advantageous when a sealing structure is provided, said sealing structure forming a seal between the tank and the filter cartridge connection apparatus and/or between said tank and the filter cartridge.

It may also be advantageous when a coding structure is provided. This can also be formed either between the tank and the filter cartridge connection element, but in particular preferably on the filter cartridge connection apparatus, so that only correspondingly coded filter cartridges can be used on said filter cartridge connection element.

Furthermore, the present invention also relates to a connection apparatus for connecting a filter cartridge in the interior of a water tank, with the connection apparatus being in the form of a component which is separate from the water tank and has fixing means for fixing the connection apparatus in the water tank such that it is fixed once and then can no longer be detached without being destroyed.

Depending on the embodiment, these fixing means can have one or more of the features of the above-described fixing means for a filter cartridge connection apparatus which is provided for connection to a water tank. The provision of a filter cartridge connection apparatus of this type which is provided as part of the basic equipment and/or as a retro-fitted piece of equipment of a water tank has, for example, the advantage that a single shape of a tank can be constructed in a modular manner with different standard connections of different cartridge-side coding structures. As a result, it is possible to provide a whole range of different application cases with water filter cartridges which are each specially provided for these using a single injection-molding die for producing a water tank, it being possible to ensure that in each case only the water filter cartridge which is provided for the specific intended use fits into the water tank in question and therefore the possibility of manipulation can be reliably prevented.

The intended uses may differ, for example, in terms of the quality of the water to be supplied, but they can also differ in terms of the appliances in which the water filter cartridges are to be used, in order to cope with, for example, different quality requirements for the water to be treated by the filter cartridge. A further economical advantage can be found in the reduced production and/or logistics costs to a water tank manufacturer who can supply possibly different appliance manufacturers with tanks having the exact specifications for the respective appliance requirements, but it being possible for the water tank itself to always have the same shape. The appliance manufacturer can therefore use, for example, an exclusive filter which can advantageously be combined with a standard tank by the equipment of the filter cartridge connection apparatus according to the invention in an advantageously exclusively coded manner.

BRIEF DESCRIPTION OF THE SEVERAL VIEWS OF THE DRAWING(S)

Figure 2:
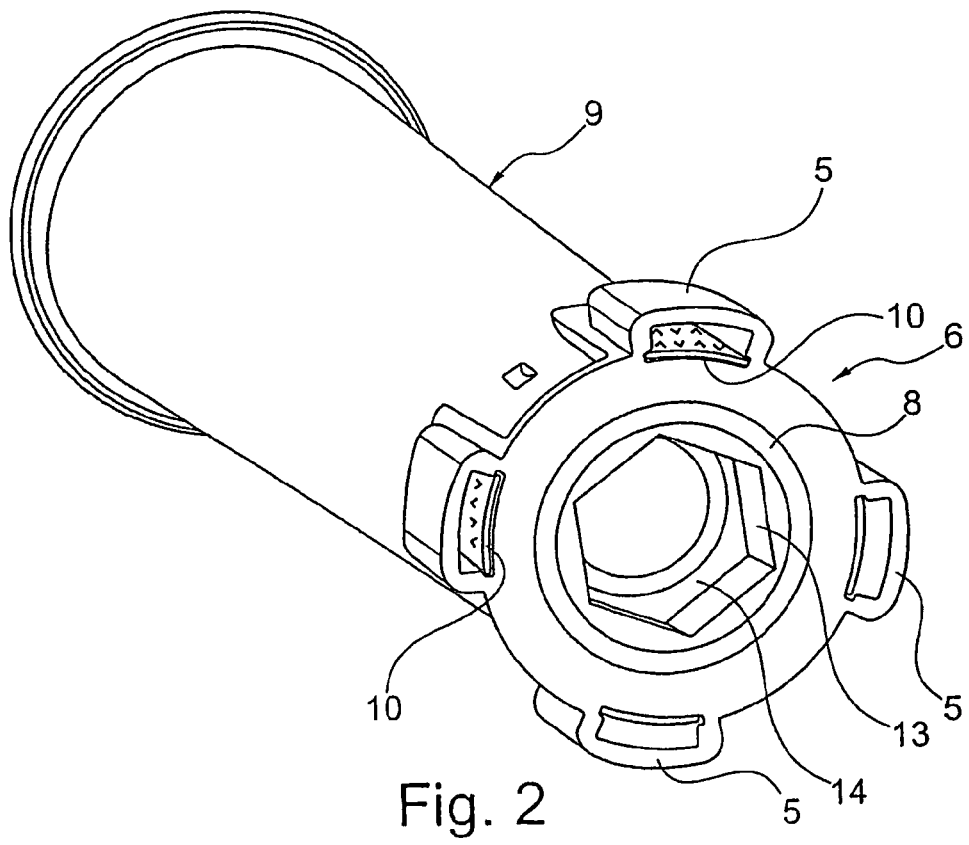
Figure 3:
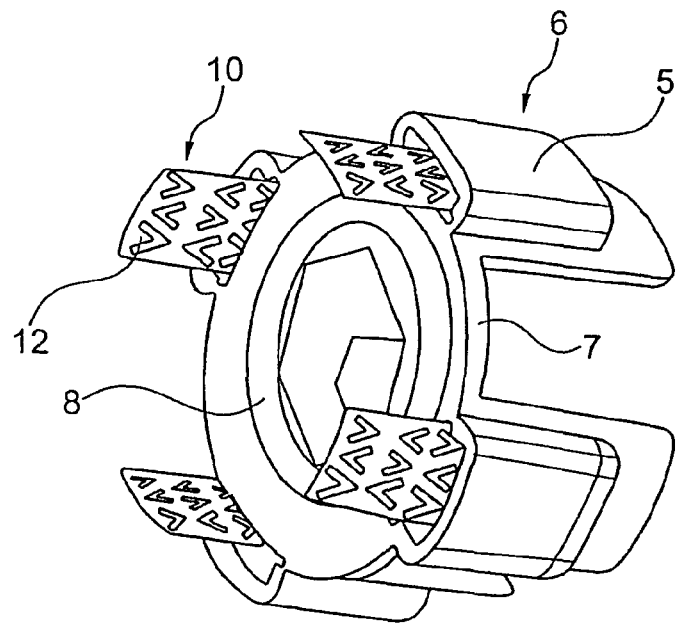
Figure 4:
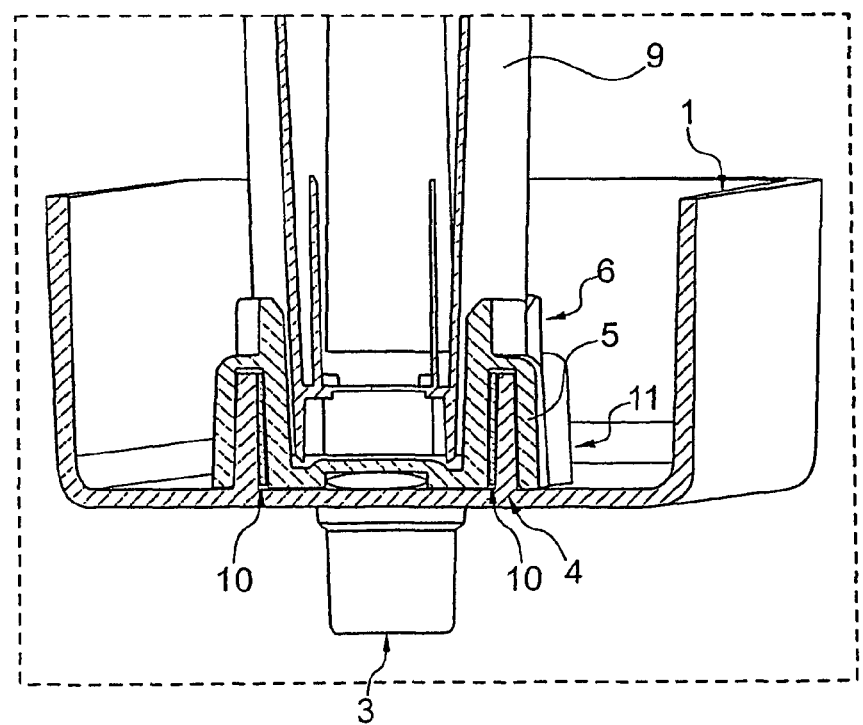
Figure 5:
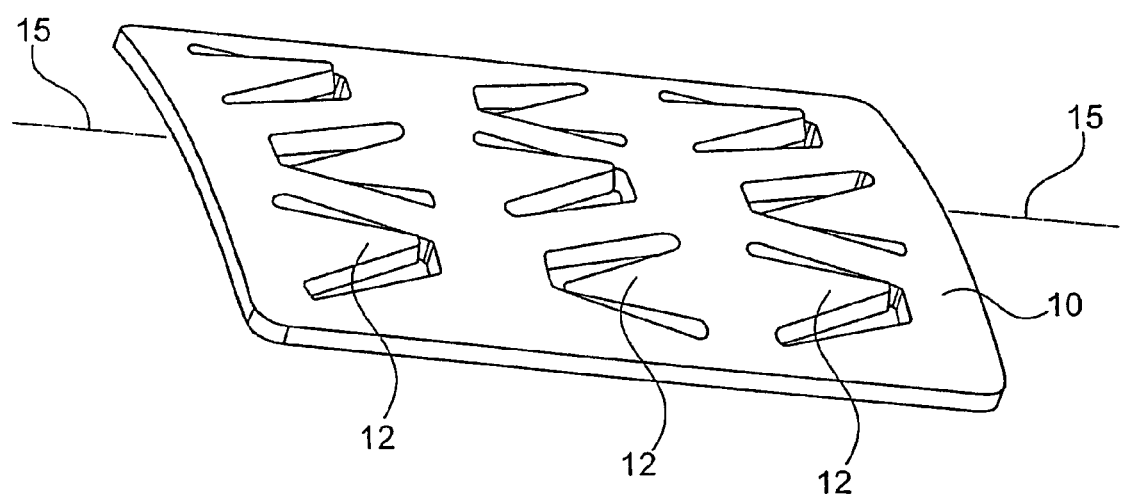

An exemplary embodiment of the invention is illustrated in the appended drawings and will be explained in greater detail below with reference to the following description of the figures, in which:

FIG. 1 shows, by way of example, a schematic perspective plan view of a water tank and a filter cartridge connection apparatus, which can be connected to said water tank, with a filter cartridge which is inserted in said filter cartridge connection apparatus, FIG. 2 shows a view from below of a filter cartridge connection apparatus and a filter cartridge which is inserted in said filter cartridge connection apparatus, FIG. 3 shows, by way of example, a perspective view of a filter cartridge connection apparatus and also one embodiment of a fixing means which are arranged on said filter cartridge connection apparatus, FIG. 4 shows, by way of example, a schematic sectional illustration through a water tank with a filter cartridge connection apparatus which is fixed to said water tank, and a filter cartridge which is inserted in said filter cartridge connection apparatus, and FIG. 5 schematically shows a perspective view of an exemplary fixing means for fastening the filter cartridge connection apparatus to the water tank.

DETAILED DESCRIPTION OF THE INVENTION INCLUDING BEST MODE

Accordingly, FIG. 1 shows, schematically and by way of example, a portion of a water tank 1 with a tank outlet 3 which is formed in the base 2 of said water tank, with three visible tank-side connecting elements 4 being arranged, by way of example in a circular manner, around said tank outlet, for example by being molded onto the tank base. In this case, these connecting elements are provided, for example in a vane-like manner, as structures which complement further pocket-like connection elements which are formed on a filter cartridge connection apparatus 6 which is to be firmly connected to the tank.

These pocket-like connecting elements 5 of the filter cartridge connection apparatus 6 are, likewise by way of example, connected to one another by means of an annular body 7. A sealing means 8, which can be inserted, for example as an O-ring, into a groove which may be provided (FIG. 2), is provided between this body 7 and the tank base. As a result, reliable sealing between the interior of the tank 1 containing untreated water and the outlet of the water tank, which is separated from said interior by the filter cartridge connection apparatus 6 and a filter cartridge 9 which is inserted in said filter cartridge connection apparatus, is possible together with simple assembly.

According to the invention, fixing means 10 for fixing the filter cartridge connection apparatus 6 to the water tank 1 are provided, these fixing means being formed such that the filter cartridge connection apparatus can no longer be detached from the tank without being destroyed. In the text which follows, these fixing means are also called single-use fixing means 10, are in the form of leaves in the exemplary embodiment illustrated by way of example here, and are inserted into the pockets 11 of the connecting element 5. When the filter cartridge connection apparatus 6 is plugged onto the tank-side connecting elements 4, these tank-side connecting elements dig, by way of claw elements 12 which are in the form of barbs and project outward from its surface in the manner of vanes, into the respectively facing surface of the tank-side connecting element 4 or the pocket 11 of the connecting element 5 of the filter cartridge connection apparatus 6 such that, together with these, they produce a long-term adhesive connection with one another by getting caught and stuck in the respective surfaces. As a result, it is no longer possible to detach the filter cartridge connection apparatus 6 from the tank 1 or from its connecting elements 4 again without causing damage.

Therefore, regular replacement of the filter cartridges 9 which are to be inserted in a simple and reliable manner without breaking the connection between the water tank and the filter cartridge connection apparatus can be ensured over the service life of the water tank.

Furthermore, it is also possible to ensure that manipulation by replacing a filter cartridge connection apparatus with another once it has been inserted is not possible.

The illustration of FIG. 3 shows the filter cartridge connection apparatus with single-use fixing means slightly inserted into its pocket-like connecting elements 5. This state may be, for example, the mounting state of the filter cartridge connection apparatus, before it is fitted to the tank by being pushed on. When the filter cartridge connection apparatus 6 is pushed onto the connecting elements 4 of the tank 1, the core elements 12 of the single-use fixing means 10 dig into both the relevant surface regions of the filter cartridge connection apparatus 6 in the interior of the pocket-like connecting elements 5 and also into the facing surfaces of the tank-side connecting elements 4 which are surrounded by the pockets 11 during the plugging-on operation.

After the filter cartridge connection apparatus is plugged onto the tank, all the elements which are essential for connecting these two parts to one another are located in the interior of the pockets 11 and are therefore protected at least in terms of manipulation which does not destroy the material (FIG. 4).

FIG. 4 shows, by way of example, a schematic sectional illustration through a tank which is provided with a correspondingly plugged-on filter cartridge connection apparatus and is fixed by means of single-use fixing means 10 according to the invention.

In an embodiment which is modified compared to the above, here multiple and single pocket-like connecting elements 5 may be formed as a element, which is formed at least partially circumferentially, possibly with interposed interruptions in which, instead of the leaf-like single-use fixing means 10 described up to this point, an embodiment in the form of closed or interrupted cutting rings 10 can be used. In this embodiment, FIG. 4 would accordingly again show a corresponding sectional illustration in which the item 10 then represents the cutting ring 10. This cutting ring can have cutting means which are formed either continuously or in an interrupted manner all the way around, and/or are analogously formed in accordance with the cutting means, which are formed as claw elements 12, of the leaf-like connecting elements 4. These cutting means can be formed such that they are selectively oriented radially inward and/or radially outward; they may also be formed severally or in multiple parts, specifically both formed radially inward and radially outward.

A filter cartridge 9, which has a coding structure 14 which complements a coding structure 13 which is formed on the filter cartridge connection apparatus 6 and represents, by way of example, a hexagon, (FIG. 2), is inserted into the filter cartridge connection apparatus 6. An enlarged view of the single-use fixing means 10 according to the invention which is illustrated in the manner of a leaf and has claw elements 12 is illustrated by way of example in FIG. 5. Said figure also shows, for example, slight rounding of the leaf-like body 10 over a body axis 15, it being possible for this rounding to serve, for example, to match the body to a circular-arc shape which is formed by the four tank-side connecting elements 4, of which only 3 are visibly illustrated in FIG. 1. However, a further function of this slight rounding can also be, for example, fixing clamping action when this leaf-like single-use fixing means is inserted into the pocket like connecting elements 5, so that said fixing means cannot fall out of said pocket-like connecting elements during or after the fitting process.

LIST OF REFERENCE SYMBOLS

1 Water tank
2 Base
3 Tank outlet
4 Connecting element
5 Connecting element
6 Filter cartridge connection apparatus
7 Body
8 Sealing means
9 Filter cartridge
10 Single-use fixing means
11 Pocket
12 Claw element
13 Coding structure
14 Coding structure
15 Body axis

What is claimed is:

1. In a water tank (1) for a beverage device having a filter cartridge connection apparatus wherein the improvement comprises a filter cartridge connection apparatus (6) formed separately from the water tank and/or water filter, said filter cartridge connection apparatus having a cutting ring and fixing means (10) for fixing the filter cartridge connection apparatus in the water tank such that said filter cartridge connection apparatus is fixed once and then can no longer be detached without being destroyed wherein the cutting ring and fixing means (10) if removed has a structure for damaging the tank and/or the connection apparatus.

2. The water tank according to claim 1 wherein the cutting ring and fixing means (10) provides an adhesive connection with the surface of the tank (1) and/or the connection apparatus (6).

3. The water tank according to claim 1 further comprising a coding structure (13, 14).

4. The water tank according to claim 1 or 2 wherein the cutting ring and fixing means form a press-fit connection between the surface of the tank and/or the connection apparatus.

5. The water tank according to claim 1 wherein the cutting ring and fixing means (10) comprise a barb-like structure (12).

6. The water tank according to claim 1 or 5 wherein the cutting ring and fixing means (10) include a pocket (11).

7. The water tank according to claim 2 wherein the cutting ring and fixing means comprise a glued connection with the surface of the tank and/or the connection apparatus.

8. The water tank according to claim 2 wherein the cutting ring and fixing means form a fused connection with the surface of the tank and/or the connection apparatus.

9. The water tank according to claim 5 wherein the cutting ring and fixing means (10) comprise leaf-like insert and/or inlay elements.

10. The water tank according to claim 1 further comprising a tank-side connecting element (4) for interacting with the cutting ring and fixing means (10).

11. The water tank according to claim 1 further comprising a connecting element (5) for interacting with the cutting ring and fixing means (10) disposed on the filter cartridge connection apparatus (6).

12. The water tank according to claim 1 wherein the filter cartridge connection apparatus is connected to the tank in the region of a water outlet (3).

13. The water tank according to claim 1 or 2 further comprising a sealing structure (8).

14. A filter cartridge connection apparatus (6) for connection to a filter cartridge in the interior of a water tank (1), wherein the improvement comprises a filter cartridge connection apparatus (6) which is a component separate from the water tank and has a cutting and fixing means (10) for fixing the filter cartridge connection apparatus in the water tank such that it is fixed once and then can no longer be detached from the tank without structurally damaging the surface of the tank and/or a connection element of the filter cartridge connection apparatus.

15. A connecting device for connecting a water tank to a filter cartridge comprising:

(a) a filter cartridge connection apparatus having a filter cartridge connection end and a water tank connection end with a passage connecting said filter cartridge connection end with said water tank connection end;
(b) a sealing means disposed intermediate said filter cartridge connection end and said water tank connection end; and
(c) a cutting and fixing device disposed in or on said water tank connection end of said filter cartridge connection apparatus to fix said filter cartridge connection apparatus to a water tank once so that the filter cartridge connection apparatus can no longer be detached without destroying the filter cartridge connection apparatus and/or the water tank.

16. The connecting device of claim 15 wherein said filter cartridge connection apparatus is connected to a water tank.

17. The connecting device of claim 15 wherein said cutting and fixing device provides for a press fit to a water tank.

\* \* \* \* \*